US012803790B2

(12) United States Patent
Westlake

(10) Patent No.: US 12,803,790 B2
(45) Date of Patent: Nov. 17, 2026

(54) METHODS FOR DISTRIBUTED DATA MANAGEMENT

(71) Applicant: Colin Phillip Westlake, London (GB)

(72) Inventor: Colin Phillip Westlake, London (GB)

( * ) Notice: Subject to any disclaimer, the term of this patent is extended or adjusted under 35 U.S.C. 154(b) by 0 days.

(21) Appl. No.: 18/678,074

(22) Filed: May 30, 2024

(65) Prior Publication Data

US 2025/0055675 A1 Feb. 13, 2025

Related U.S. Application Data

(63) Continuation of application No. PCT/GB2022/053054, filed on Dec. 1, 2022.

(60) Provisional application No. 63/284,816, filed on Dec. 1, 2021.

(51) Int. Cl.

| | |
|---|---|
| ***H04L 9/08*** | (2006.01) |
| ***G06Q 20/38*** | (2012.01) |
| ***G06Q 20/40*** | (2012.01) |
| ***H04L 9/32*** | (2006.01) |

(52) U.S. Cl.

CPC ....... *H04L 9/0825* (2013.01); *G06Q 20/3825* (2013.01); *G06Q 20/3829* (2013.01); *G06Q 20/401* (2013.01); *H04L 9/3247* (2013.01)

(58) Field of Classification Search

CPC ... G06Q 20/383; G06Q 20/401; H04L 9/3247

See application file for complete search history.

(56) References Cited

U.S. PATENT DOCUMENTS

| | | | | |
|---|---|---|---|---|
| 10,810,212 | B2 * | 10/2020 | Cudak | G06F 16/24578 |
| 11,003,718 | B2 * | 5/2021 | McLean | H04L 63/20 |
| 2012/0173433 | A1 | 7/2012 | Park et al. | |
| 2020/0311307 | A1 * | 10/2020 | Levy | G06F 21/6245 |
| 2022/0217001 | A1 * | 7/2022 | Dhanabalan | H04L 9/088 |
| 2023/0068788 | A1 * | 3/2023 | Thubert | G06F 9/455 |
| 2024/0062301 | A1 * | 2/2024 | Kaplan | G06F 21/51 |

FOREIGN PATENT DOCUMENTS

| | | | |
|---|---|---|---|
| EP | 0986017 | A2 | 3/2000 |
| EP | 0986017 | | 11/2003 |
| JP | 2018067201 | | 4/2018 |
| JP | 2018067201 | A | 4/2018 |
| WO | WO0190861 | | 11/2001 |

OTHER PUBLICATIONS

Office Action, Indian Patent Office, Application No. IN202417049236, filed Jun. 27, 2024, dated Dec. 12, 2025, all pages.

* cited by examiner

*Primary Examiner* — Olugbenga O Idowu

(74) *Attorney, Agent, or Firm* — Pierson IP, PLLC

(57) ABSTRACT

The invention relates to a computer implemented method for distributed data management on a user device. The method may comprise receiving a query for data from a central server; determining that data stored on the user device satisfies at least one condition of the query; determine a previously generated public key, generated by the user device, using the data stored by the user device, wherein the data stored by the user device comprises a data envelope comprising data and the previously generated public key, and wherein the data envelope has been signed by an external entity; signing the data envelope using a private key forming a key pair with the previously generated public key; and responding to query with the signed data envelope.

20 Claims, 10 Drawing Sheets

Figure 1 Representation of a data point

Figure 2. Data flow during payment

Check conditions

Store verified data point

METHODS FOR DISTRIBUTED DATA MANAGEMENT

The invention relates to methods and systems for distributed data management, including storage and exchange of information with the aim of allowing aggregate querying without compromising privacy.

BACKGROUND

Consumers are becoming increasingly aware of the existence and value of the data trails generated by their commercial activities both online and in the physical world. Many are wary that this data may be misused, although they also value offers from merchants which are almost invariably data driven.

Merchants depend on large repositories of consumer data to optimise their business models and strive to collect ever more but are becoming wary of the business threats posed by data breaches. Governments have started to tighten regulation of data usage and retention and have passed legislation such as GDPR, HIPPA and CCPA (California Privacy Act) with massive fines for non-compliance.

SUMMARY OF THE INVENTION

The system proposed here allows both parties appropriate control without sacrificing functionality. Under the system merchants can perform queries on data without having direct access to individual data points. They can make promotional offers to consumers who meet ad hoc criteria of arbitrary complexity without knowledge of their identities. Consumers can control what data is revealed to merchants and are able to redeem offers without revealing to the merchant that they are doing so. The merchant can see data relating to the overall efficacy of the promotion without access to the identities of those individuals who took advantage of the promotion.

Most people today own a smartphone. These are essentially mobile computing devices connected to a data network. They normally contain strong security and are personal to the user, making them ideal repositories of personal data. By avoiding centralised stores and dispersing the data across a large number of devices the risk of hacking is vastly reduced. If data resides only on the consumers' mobile devices and not on the merchants' servers risk to both parties is reduced.

By allowing data query without revealing identity and returning results to the merchant only in aggregate it can be envisaged that data that the merchant was never privy to can be included in the selection terms. For instance, a travel company might be interested in offering a promotion to anybody that had spent more than a certain amount on airline tickets in the last year even where that spend occurred elsewhere. In this instance the desired set inclusion involves customers of competitors, but this need not be the case. In some instances, merchants may be interested in making offers to consumers whose purchase history in completely unrelated industries makes them attractive. Data of interest is not limited to that generated by commercial activity, but may include many other sources e.g. location data gathered from GPS or from Bluetooth or WiFi beacons or lifestyle related data from fitness applications.

In order to avoid data leakage, it is important that the consumer is able to claim the reward or promotion without the knowledge of the merchant. This means that the reward must be fungible to cash. By creating a payment mechanism where funds are earmarked as being useable only with particular merchants and potentially have defined lifespans, but are otherwise indistinguishable, the desired result can be achieved.

In the operation of such a scheme there are two considerations of paramount importance; Firstly, neither the system operator nor participating merchants should obtain user data during the operation of the system. Secondly, the provenance and authenticity of all data must be assured.

According to an embodiment of the invention there is provided a computer implemented method for distributed data management on a user device, comprising: receiving a query for data from a central server; determining that data stored on the user device satisfies at least one condition of the query; determine a previously generated public key, generated by the user device, using the data stored by the user device, wherein the data stored by the user device comprises a data envelope comprising data and the previously generated public key, and wherein the data envelope has been signed by an external entity; signing the data envelope using a private key forming a key pair with the previously generated public key; and responding to query with the signed data envelope.

Signing the data envelope with the private key forming the key pair may be performed before the query is received.

The external entity may have provided the data, or the external entity has vouched for the authentication of the data. For example, the externa entity may be a merchant that has performed a transaction with the user (i.e., user device), or an information verification service used to verify that a user's personal data is accurate/authentic.

The query for data may comprise a query public key, and the signed data envelope is encrypted using the query public key before responding to the query.

The user device may respond with a short form random identifier and the signed data envelope.

The query may be pushed to the user device by the central server, or the query may be collected by the user device from the central server.

The data stored by the user device may be at least one of data relating to a transaction and private data.

The user device may respond with the signed data envelope and an external entity identification and optionally a public key of the external entity.

The user device may be connected to a predetermined number of peer devices, and the user device forwards the query to the peer devices for processing.

The method may comprise: receiving a message from the central server relating to a transaction; generating a transaction public/private key pair and transmitting a request to the transaction merchant for transaction data with the transaction public key; and receiving and storing a signed data envelope comprising the transaction data and the transaction public key, wherein the data envelope has been signed with a private key of the transaction merchant.

The method may comprise receiving a validator public key and encrypting the data stored by the user device which satisfies the at least one condition with the validator public key and transmitting the encrypted data to the validator.

According to an embodiment of the invention there is provided a computer implemented method for distributed data management on a central server, comprising: generating a query for a user device; receiving a signed data envelope and a public key from the user device in response to the query and providing the public key to at least one validator;

and receiving a result from the at least one validator based on whether data of the signed data envelope satisfies a condition of the query.

The method may comprise pushing the signed data envelope and the public key to the at least one validator, or making the signed data envelope and the public key available for collection by the at least one validator.

The central server may receive a plurality of signed data envelopes and associated public keys and provides the plurality of signed data envelopes and associated public keys to a plurality of validators and combines the results from the plurality of validators.

According to an embodiment of the invention there is provided a computer implemented method for distributed data management using a validator, comprising: receiving a public key of a user device and a query from a central server; providing a validation public key and the public key of the user device for the user device; receiving a data envelope associated with the public key of the user device, wherein the data envelope is signed with the validation public key; determining if data in the data envelope satisfies at least one condition of the query; and transmitting to the central server a result based on whether the data in the data envelope satisfies the at least one condition of the query.

The data envelope may be encrypted with the validation public key. The validation public key is a public key issued (or generated) by the validator.

The validation public key and the public key of the user device may be sent to the user device or made available for the user device to collect.

Receiving a public key of a user device and a query from a central server may comprise receiving a plurality of public keys and selecting one for processing.

The validator may be a user device.

According to an embodiment of the invention there is provided a computer program comprising instructions which, when the program is executed by a computer, cause the computer to carry out any of the methods descried above.

According to an embodiment of the invention there is provided a computer-readable medium comprising instructions which, when executed by a computer, cause the computer to carry out any of the methods descried above.

According to an embodiment of the invention there is provided a data processing device comprising a processor adapted to perform any of the methods descried above.

BRIEF DESCRIPTION OF THE FIGURES

Embodiments of the invention will be described, byway of example, with reference to the following figures, in which.

DESCRIPTION

Figure 1:
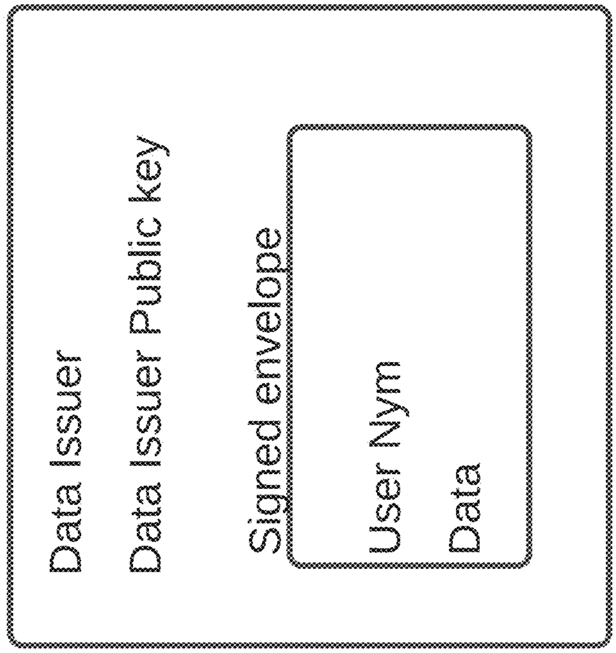
FIG. 1 illustrates a representation of a data point.

The term Nym represents a randomly generated identity used for the purposes of anonymisation. It consists of a public key and an optional short form random identifier. The private key corresponding to the exposed public key is retained by the Nym holder and is never revealed to any other party. References to Nym generation refer to the process of generating the public/private key pair and optional short form identifier. References to sending of Nyms to other parties always refer to the public portion of the Nym only—never the private portion. A user will typically have many Nyms, possibly as many as one per transaction. The use of Nyms allows a user to present multiple identities when transacting with different parties.

SC means 'system co-ordinator'. This is a process that is responsible for the execution of business logic and message routing. The term is synonymous with 'transaction coordinator' and the two terms are used interchangeably below. The system co-ordinator may be implemented on a central server.

VN means 'validator node'. These are responsible for checking the provenance of data and that it meets required conditions. The term is synonymous with 'transaction verifier'. The two terms are interchangeably used below.

NAT stands for Network Address Translation.

IP means Issuer Processor. These entities process card transactions on behalf of the card issuer.

BIN means Bank Identification Number (the first 6 or 8 digits of the card number).

PSP means Payment Services Provider, otherwise known as a 'Payment Gateways'. These provide interfaces that the merchants use to make payment requests over the Payment Networks (e.g., VISA, Mastercard and Amex) to the issuing banks.

Txn means transaction.

Txn id means transaction identifier.

Uuid means universally unique identifier.

A system is provided where users store data on their own devices. These devices could be of varied type for instance smartphone, tablet, personal computer, smart-watch, or other device capable of carrying out computation and communicating over a network. Data can be categorised into channels. Channels are associated with 3rd parties which are instrumental in the creation of, or have legitimate interest in, certain data. An example of such 3rd party data might be purchase history or rewards points. In addition to these 'public' channels there is at least one channel which contains private data which is inherent to the individual concerned. For example, a user's sex, birth place, birth date and financial information are examples of such data.

According to the system there is provided a mechanism for individual users to route messages between them forming a peer-to-peer network. Messages are encrypted so that they cannot be read or interpreted by nodes in the network other than the intended destination. Usage of nested encryption envelopes allows routing of data without revealing content or ultimate destination.

Channel partners are entities with whom the user has transacted for one reason or another. This could be a financial transaction for instance the purchase of a good or service, but other types of transaction are possible, and it is not necessary for a financial exchange to have taken place.

If a user makes a transaction with a channel partner, then information relating to that transaction could be added to the user's data store on their device and marked as belonging to the appropriate channel. The user may opt to make some of that information available to other channel partners either directly or by way of allowing inclusion in the result of a set query (see below)

To preserve anonymity, every time a user device interacts with a merchant it may generate a new identifier henceforth referred to as a 'Nym', which consists of the public key of a public/private key pair and an optional identifier of shorter form. The Nym stands as a proxy for the user's identity, effectively allowing the user to present different 'identities' to different parties while maintaining the ability, by storing the key pairs on the user's device, to prove ownership of the Nym and hence of any data point that includes it in a signed envelope.

Channel partners are able to perform queries which return aggregate results (e.g. sum average, median etc.) or return set membership (e.g. where clause) without gaining knowledge of the data for individuals. In the case of set membership, the results consist of a set of Nyms which represent the users without revealing their identity. This is achieved by the mechanism described below.

Each node maintains a connection to a small number of peers. In a mobile scenario, extensive use of multiple NAT layers (often referred to as carrier grade NAT or CGNAT) P2P networking may require the use of an overlay network (e.g. ZeroTier) to function. When a query is received from a channel partner a node forwards the query to each of its peers and also executes the query itself. The behaviour varies slightly depending on the type of query involved; For a set membership query (e.g. where age is between 30 and 40 and sex is male) a simple binary response is all that is required. There may be situations when the channel partner may wish to respond in some way to users matching the query e.g. by issuing a redeemable voucher. In order to maintain the privacy of the respondent, the node will generate a unique temporary id to attach to the response. The response will be routed through one of the nodes peers (not necessarily the peer that originally routes the query) which will maintain a route back for any possible response. In order to limit the size of routing tables, routes have a pre-defined limited life which is attached to the response.

Fungibility of Rewards and Anonymity of Claims

Users must be able to claim their rewards without the reward issuer being aware of individual claims. Making rewards fungible to cash to be used as full or part payment in an electronic transaction such that when a user pays a merchant, the merchant has no way of telling how much, if any, of the payment is by way of reward fulfils this criteria.

This works by having special functionality built into the issuer processor. The Issuer Processor acts on behalf of the issuing bank to provide the system of record, authorizing transactions on their behalf.

Under this system, the Issuer Processor maintains multiple balances for each card, in addition to the standard balance of available credit, each additional balance corresponding to available monetary rewards from a participating merchant. Some merchants may have multiple reward schemes each with their own balance. When a customer wishes to make a purchase from a participating merchant, he uses his linked card to pay, and the details of the transaction are sent to the Issuer Processor (IP). The IP identifies the merchant in question from the transaction data and checks to see if the customer has any available rewards balance that may be used for the transaction. If there is a balance available, the system may optionally send a message to the customer to see if they would like to redeem this balance against their purchase or it may just proceed by immediately netting off the available reward balance against the purchase and charging the rest to the card.

In an alternative scheme, the reward balances are held on the customer's device in the form of digital tokens which can be sent to the IP at the time of the transaction.

At settlement time, the merchant will see a shortfall between the authorisations obtained and the total settlement value equal to the total value of rewards redeemed. As this is an aggregate figure, little can be deduced about which customers took up which offers.

Anonymisation of Responses and Rewards

Each consumer device maintains its own data store. In practical terms this is most likely to mean that each consumer has installed an application on their device and that this application maintains the datastore on the device. Merchants can issue queries that are executed on each device. The queries can either be pushed to the devices or the query can be collected and executed when the device contacts a central server. Queries can be of two types; One type determines whether a consumer has characteristics that cause them to be included in a given set whereas another results in a numerical answer which is used for the compilation of statistics. Responses can be either synchronous or asynchronous. In the latter case each query must supply a unique identifier (GUID) that can be returned with the response. In the event that the response is positive, the merchant may wish to allocate a reward to the customer. This is done by passing a digital token to the device that it can later 'cash in' by sending to the IP. It is envisaged that there could be a secondary market for these digital tokens which would benefit both consumers and merchants alike. If a consumer were to receive a reward token from a merchant with a face value of say $10, he might be interested in selling the token to another consumer. That other consumer might be interested in paying up to, say, $5 for the token. The benefit to the merchant in allowing such a transaction being that he might gain a new customer from it.

As an extension of this scheme the merchant could set certain conditions on the sale of the token, restricting the availability to purchase to those that meet certain criteria. Those conditions may vary from the original conditions attached to the token. For instance, whilst the original token might be issued to existing customers with a high spending profile, the merchant might be happy for the token to be sold on to others who were not currently customers but had a certain level of disposable income. The consumer facing app can facilitate this by publishing the availability of the token for exchange with the relevant conditions attached. Other consumers will then be made aware of the offer in the marketplace if they meet the criteria attached to the offer. The conditions may not be visible to end users, their devices being required to demonstrate compliance with attached criteria before displaying the offer. Payment could be made either in cash credits or by exchange for other tokens or fractions thereof.

Limits could be placed on the number of times a token changes hands and there could be rules governing how the value of the token could change as a result of each transaction. The central exchange could take a commission on each transaction. As well as having expiry dates tokens could diminish in value over the passage of time according to predetermined formulas.

The ability to split tokens implies a centralised function to revoke previously issued tokens and reissue two or more tokens in their place. A ledger system is also required to prevent double spending. This could be managed through a centralised or distributed database. For instance, a crypto-currency system such as Ethereum, Hyperledger or other similar blockchain based system could be used. Merchants may wish to provide nodes to this system as part of their assurance that the transactions are proper. This is especially true as, due to the way the system anonymises users, merchants may otherwise be wary to trust a centralised authority.

In addition to a fixed price offer mechanism, it is also envisaged that exchange of tokens might occur by way of auctions.

Checking Users' Data Points without Leaking Data

Any data provided by a user to claim eligibility to receive or redeem a token must be checked for provenance and ownership. Performing this check centrally would leak data to the system operator and would also raise the concerns over the undue centralisation of power, offering the opportunity for bad actors in the employ of the operator to game the system. These problems can be overcome by disseminating the data validation function across several randomly chosen participants taken from the user pool. This system is extremely resistant to corruption by bad actors as it removes the central point for attack.

The user devices can be configured to poll the main system at intervals, allowing the opportunity to hand tasks to them as they do so. When connecting to collect any pending tasks, the user devices supply a public key which may be generated on the fly for each message exchange. This key can then be sent to the user requesting data validation allowing them to encrypt a message to be passed to the validator user in a way which is not readable by intermediate servers involved in the communication.

Because the user devices may be behind multiple layers of NAT, it may not be possible to establish direct peer to peer communication, in which case a central server needs to act as a common communication point with both devices maintaining connections to it. Either way, well known mechanisms exist to enable encrypted end to end communication between the two user devices.

To enable this functionality, a name resolution facility akin to DNS (Domain Name System) needs to exist so that the two user devices can find each other.

Under this scheme, although the central system knows that data has been passed to validators to check, it does not have knowledge of the data itself. Likewise, although it has knowledge of the predicates used in the conditions attached to any offer, it does not know why a given user passed or failed a particular check.

The validator involved in each condition check will be privy to this information but will not know the identity of the user in question. Where the conditions attached to a particular offer allow, the system may be further improved by breaking the condition checks into several steps and splitting the task amongst different validators. For instance, if the conditions are that the user must be between 25 and 35 years old, reside in a certain area and have spent more than $5000 on vacations in the last 12 months, these three tests (which are joined by AND predicates) could be split amongst 3 different validators, thus restricting the information revealed to each. Where the conditions are complex, it might be advantageous to layer the validators and operate the tests in a map-reduce manner.

In addition to ensuring that the validation function can be performed without data leakage, it is also important to be able to check the provenance of every data point provided by a user. It must not be possible for malign users to create fake data points or to claim ownership of a data point that is not theirs. This can be achieved by ensuring that each data point contains a reference to the data owner and is signed by the data point provider. The structure of such a data point is shown in FIG. 1. The user provides a Nym for the transaction which is unique but not readily identifiable and the data issuer (typically a merchant) signs the data and Nym with their private key. Because only the user has the private key to the Nym, the data structure provably ensures that:

1) The data issuer is the source of the data

2) The Nym holder is the rightful owner of the data

Token Validity and Eligibility of Holder to Redeem

The token's validity is proven by cryptographic signature of the issuer. Conditions may be attached to the token.

To redeem a token a user must provide evidence of both ownership and eligibility matching any attached conditions. Ownership is proven by checking the cryptographic signature associated with the token and/or the associated ledger entry Eligibility can be proven by use of a vouching system where an unbiased verifier processes the claim by verifying each data point checking signatures on the data point. The verification process can be disseminated amongst a group of verifiers chosen at random from a pool of users and the results combined using a Map-Reduce algorithm.

The provenance of each data point is checked by verification of the issuing signature. The ownership of each datapoint is checked by verification of the owning signature.

Once ownership and provenance of each data point has been verified, compliance with attached criteria can be checked. Reverse order of operation is possible.

Each operation may be completed by one or more participants, increasing resilience and reducing the opportunity for bad actors.

Steps:

- Present token for redemption along with conditions and a list of data points.
- Allocate transaction coordinator.
- Disseminate datapoint verification tasks.
- Coordinate responses.

The Transaction Coordinator receives a list of data points. It assigns each data point to a transaction verifier which coordinates with the claimant to verify the signatures on the point. Note that this process includes verification that the nym attached to each data point is under the same ownership as the nym used by the claimant when the token is presented. This proof is available because the signature verification check for each data point proves that the claimant has control of the private key corresponding to the public nym key wrapped in the data envelope.

Message Routing

To preserve the integrity of personal data, it is desirable that the central servers do not have a way of inferring the identity of the devices that they communicate with.

Whilst mobile devices tend to change IP address quite frequently on mobile data networks, when connected to wi-fi, IP addresses may be fixed or quasi fixed with infrequent address changes and this can lead to the possibility of inferring identity from the originating IP address of a connection. For this reason, it may be desirable to use a type of mix network in the system. Mix networks make the end points of communications hard to trace both for eavesdroppers and for malicious mix nodes by the use of public key cryptography. A sender wraps a message in a multiple layered series of encrypted envelopes, each envelope containing the address of the next hop in the chain and an encrypted payload of another envelope. This can be envisaged a bit like a set of Russian Matryoshka dolls, each doll containing other dolls nested within it. The first node decrypts the outer envelope and gets the address of the next hop and the encrypted envelope destined for that server then forwards the message. The next server in the chain does the same all the way until the final destination is reached. Each envelope is encrypted with the public key of the server that is destined to process the message with each server having a different public key, thus ensuring that next destination is unreadable to any other server and that the final message is only decryptable if the message has passed through all the required servers in the proper order. Mix networks typically have each node in the chain introduce a random delay in forwarding messages to frustrate correlation attacks. Replies to messages are normally orchestrated by a system akin to that used for the original message but instead used to provide anonymised reply addresses. However, in a mobile network it is often not possible for devices to receive inbound connections because of the extensive use of multi layered NAT (Network Address Translation). This calls for a special scheme to overcome the issue. Either responses must be synchronous, which makes the mix network vulnerable to correlation attacks or the sender must be able to receive inbound connections, or the sender must poll for responses to his message. Where mobile networks are involved, it is either necessary to use a peer-to-peer network (which brings its own complications) or to have the sender poll for responses.

The mix servers could be run by a central authority, merchants, or a mix of both. Alternatively, the system could be organized as a Peer-to-Peer network with users' devices acting as mix nodes.

Token Security

Need to reconcile token security with the need to view balances

Verifiers

To avoid leakage of data to the system operator, user peers selected at random can be used as verifiers. The system does not need to trust an individual verifier as several can be used to check the same data point.

Figure 4:
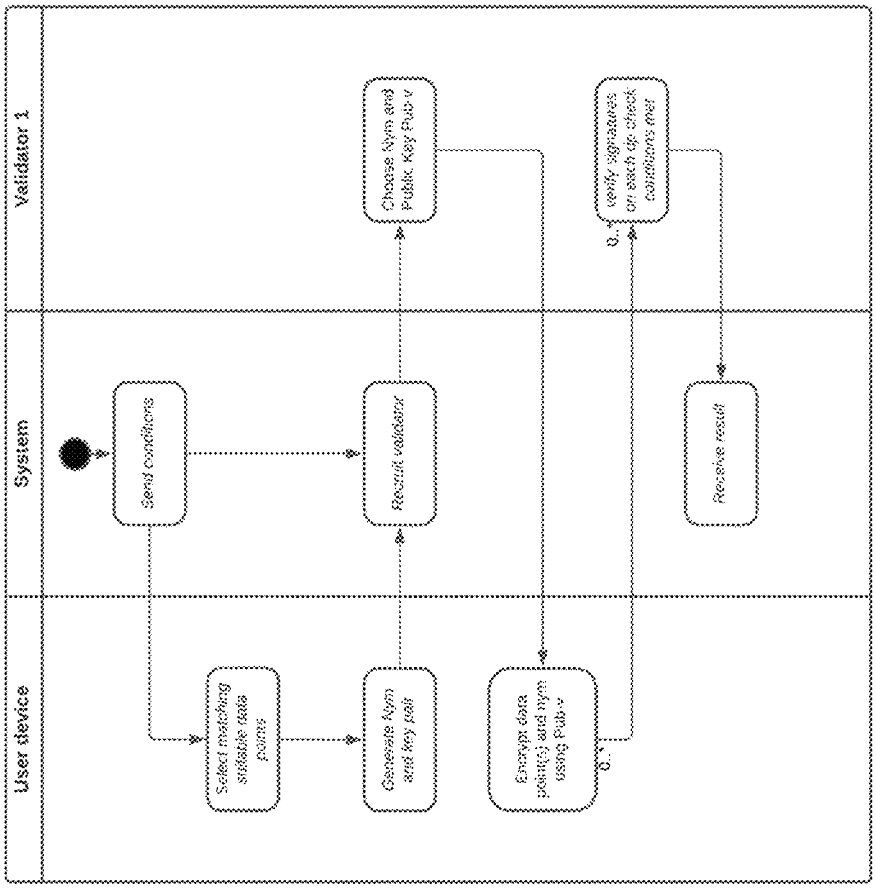
FIG. 4 illustrates a process for validating that data points meet conditions of a query.

With reference to FIG. 4:

When the need arises, the system may send a set of required conditions to a user device. The user device then selects appropriate data points from its store and selects or generates a key pair for use with each data point or subset of data points, returning these to the system. The next step is for the system to select one or more validators for each data point or data subset. The validators are processes that run either on servers owned by any participant organisation in the network any other server, or on individual users' devices. By choosing validator nodes at random where the validators have no interest in the transaction and optionally requiring multiple validators to check each data point, the validation process becomes trustable. Because each data point or subset of data points is associated with its own nym, the identity of the data holder is not revealed thus maintaining privacy.

The validating node then checks that the supplied data point matches the supplied condition, signs it with its own key Data Security and Frustration of Bad Actors It is important that the provenance of data stored on the user's device be traceable and that it is not possible for a malicious user to tamper with data to receive rewards for which they are not eligible. Equally, it must not be possible for a malicious user to generate fake responses to queries for the same purpose. There are multiple possible approaches to this problem:

The preferred scheme is to wrap public key of user (N.B. a user will have many public keys—one associated with each Nym in use) and data in a signed envelope at the point of issuance. As this can be verified using only the public key of the issuer, no round trip to the issuer is required. Although the computational load is higher when data is issued and signed, validation is highly distributed and causes no load on the merchant servers. It also adds the property of non-repudiation; It is provable that the merchant issued the data point in question.

An alternative scheme is to generate an HMAC to store with data and user Nym. The verifier must contact the issuer to validate the HMAC as the HMAC secret cannot be shared with verifiers that are also users. The merchant servers are involved in each validation, but the computational effort in each validation is low. There is some leakage in that the merchant is aware of the query on each point.

Another alternative scheme is to use homomorphic encryption, which allows for computation over encrypted values without decryption taking place. The process is slow but poses less of a problem where the processing is performed on the consumer device as the amount of data involved is tiny. At the time of writing, it is still not really practical, but this could change in the not-too-distant future. Use of this technique makes it impossible for a bad actor to produce fake results to a query as both the values in the query and the data itself are encrypted and cannot be recovered without the key.

Zero Knowledge Proofs (ZKP) offer a way of asserting that a party has in their possession certain knowledge without the need to reveal the knowledge itself. Whilst this serves to stem the leakage of information it must be combined with other techniques to guarantee the veracity of the claims themselves.

As this is a wide problem space, other solutions may be apparent to those skilled in the art and could be equally suitable for the purpose.

Transaction Flow Leading to the Creation of One or More Data Points

Figure 2:
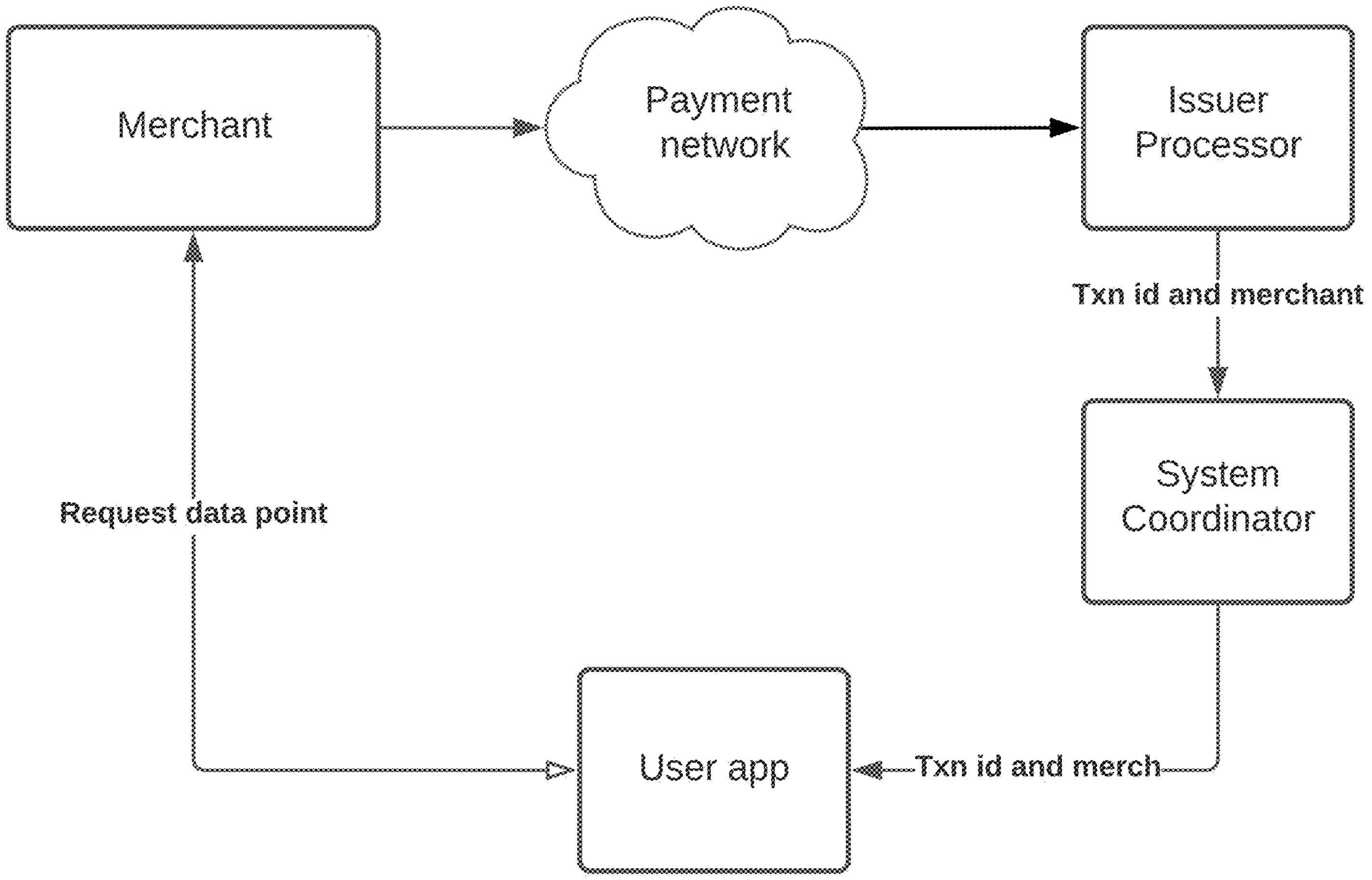
FIG. 2 illustrates a data flow during payment.
Figure 5:
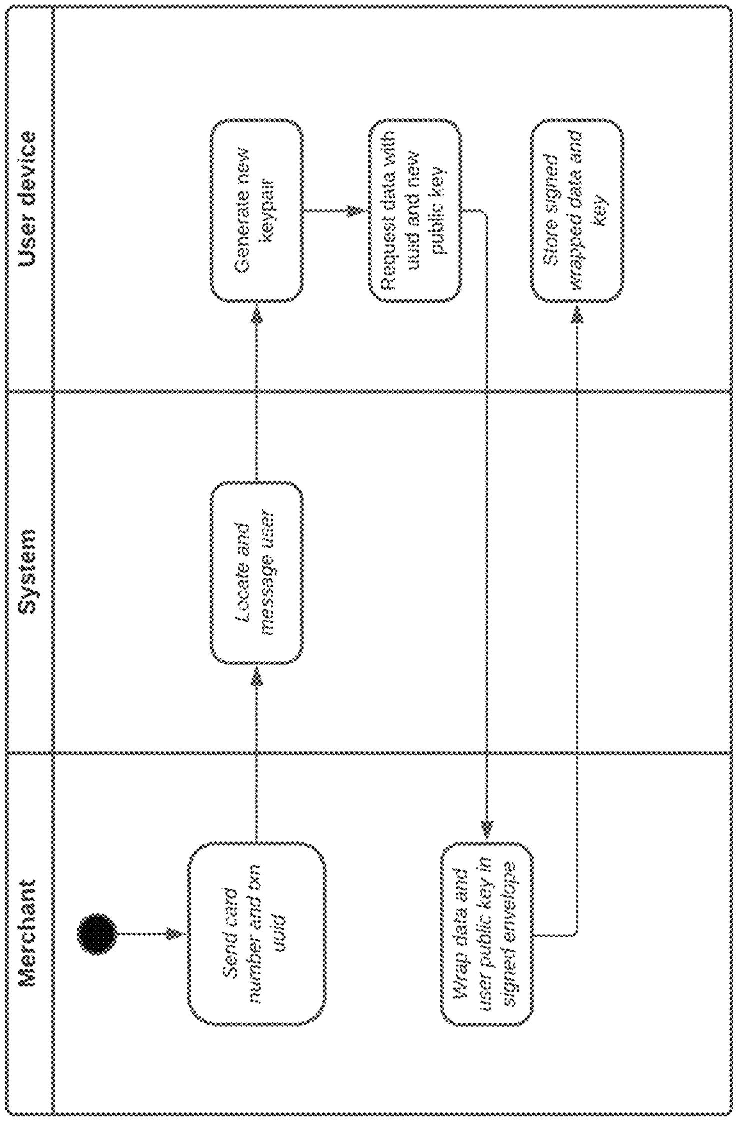
FIG. 5 illustrates a process for storing a verified data point.

With reference to FIGS. 2 and 5

The user makes a transaction with a merchant, paying with a card issued by the system provider. The card may be a physical card or may be a one-time card number generated by the system for use in a particular transaction. The payment network routes the transaction to the IP based on the BIN number of the card. The IP can see the transaction details including the merchant transaction reference number. In addition to the normal processing of the transaction, the IP sends a message containing the merchant ID, the merchant transaction ID and optionally other data to the SC which queues the message for delivery the user's app running on their device. If the app is currently connected to the system, the message will normally be delivered immediately.

When the user's app receives the message, it generates a Nym for the transaction and makes a request to the merchant for a data point. The request may optionally include other data allowing the merchant to verify with the system that the request is genuine.

The merchant adds the Nym and the requested data to a signed envelope (signed using one of the merchant private keys) and returns the entire data structure to the user's app which stores it for later use.

Transaction Flow Involving Redemption of a Token Representing a Reward

Figure 3:
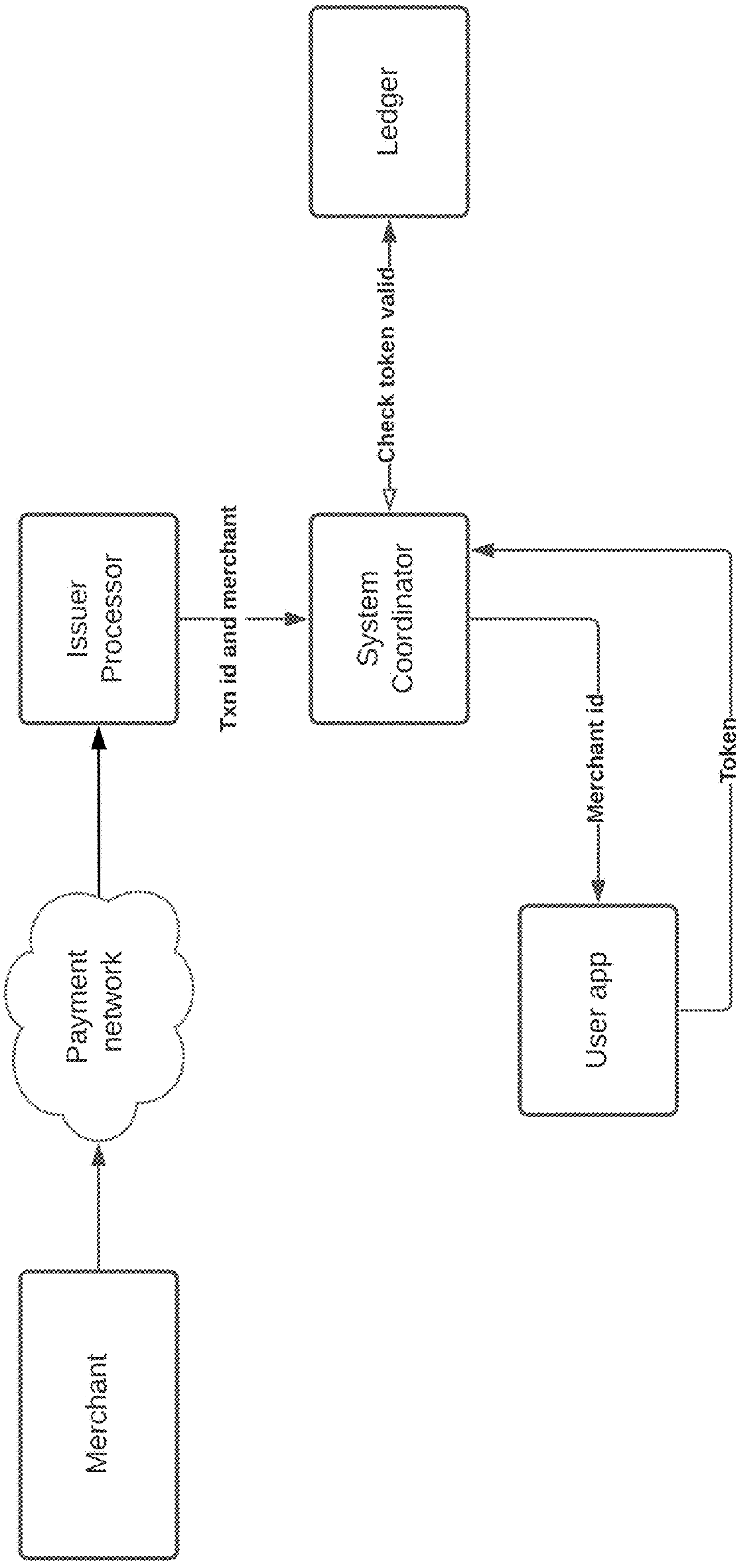
FIG. 3 illustrates an alternative data flow during payment.

With reference to FIG. 3.

The flow starts off in the same way as a flow without token redemption but when the SC sends the identity of the merchant to the user's app, the user is given the option to select token(s) to redeem against the transaction. The token ids (or tokens themselves) are then sent to the SC which checks the token against a ledger to see if all conditions are met e.g. the user is the rightful owner, the token has not expired and the token is valid to use in the particular transaction type involved. This last step may require the SC to make a data request to the merchant to retrieve more details of the transaction.

If conditions are not met the user is informed, otherwise credit for the token is applied to the transaction so that the user's account will be charged less than the face value, the balance being netted off against the token. Importantly, this process is not visible to the merchant, who has no way of knowing that a token was redeemed.

Note that there are two possible modes of operation which can be used to achieve the same result. Either the rewards can be held in the form of tokens which are issued after the user passes appropriate entitlement checks, or the use of tokens can be dispensed with, and the entitlement checks can be made at the point of claim. Note that in both cases, it is still necessary to maintain a ledger to prevent double spend. The ledger is also required if tokens are to change hands or to be split or have their values adjusted for whatever reason.

Note that in FIGS. 2 and 3 the PSP is omitted for clarity.

Transaction Flow without Use of Payment Network

Figure 6:
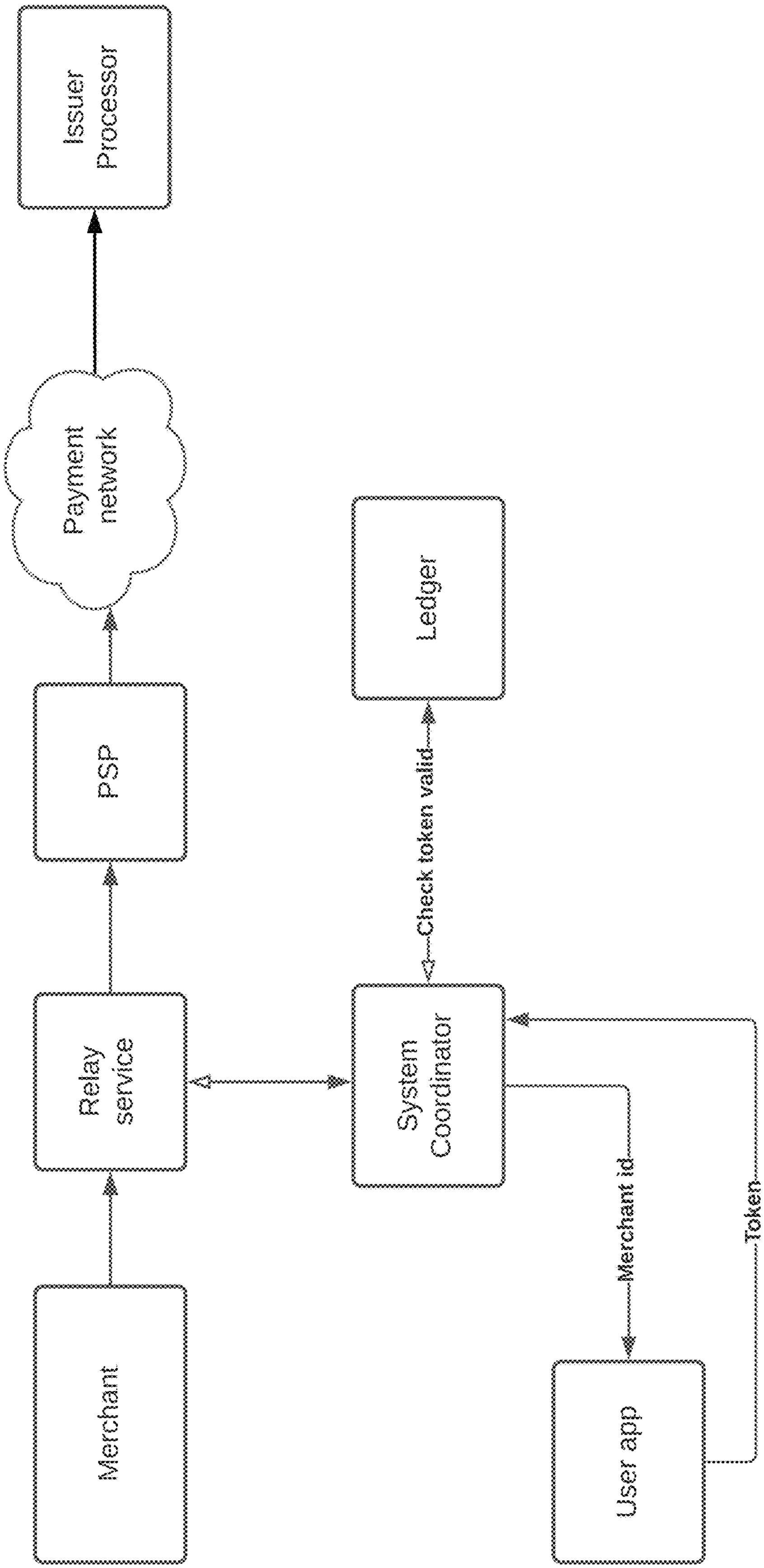
FIG. 6 illustrates an alternative data flow during payment.
Figure 7:
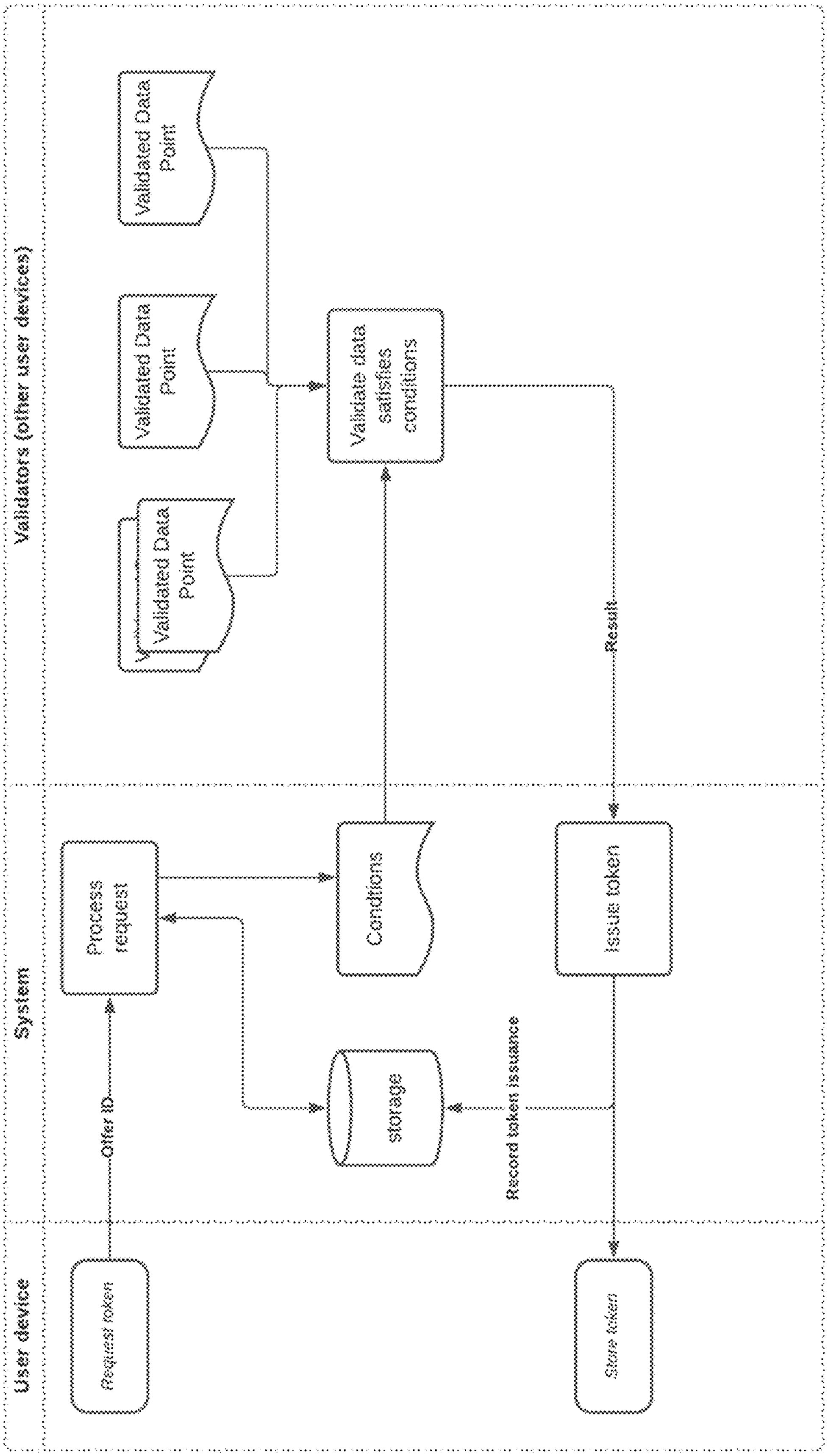
FIG. 7 illustrates a process for validating that data points meet conditions of a query.
Figure 8:
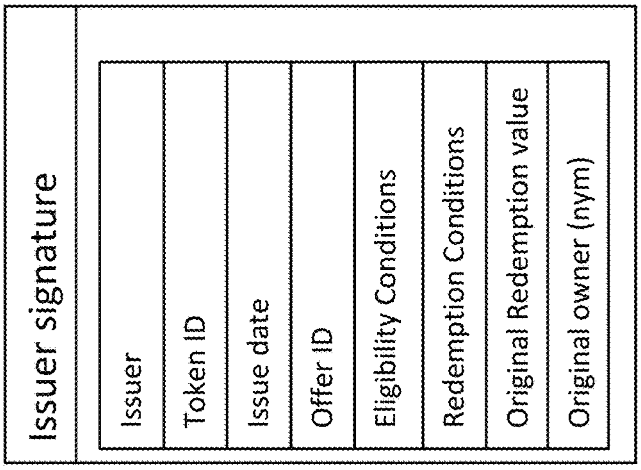
FIG. 8 illustrates an example of a token signed by an issuer.
Figure 9:
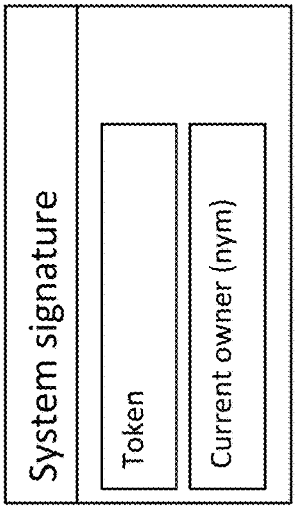
FIG. 9 illustrates an example of a system signature.
Figure 10:
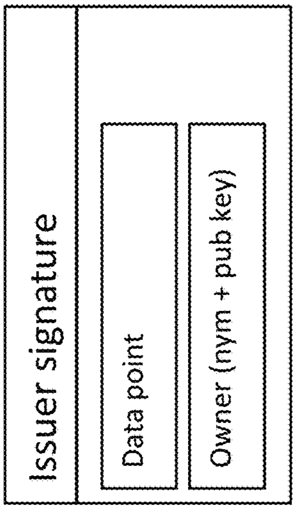
FIG. 10 illustrates an example of an issuer signature.

With reference to FIG. 6.

Instead of using the IP to observe the transaction, the system operator may provide a service which sits between the merchant and the PSP which relays the requests and responses, optionally modifying both during retransmission. This enables the same functionality as described for the IP, but for any payment card—not just those with BINs associated with the IP. For instance, if a request was made for a payment of $100 and the system determined that the user had a token with $10 value that he wished to redeem, the service could dynamically alter the payload of the PSP request reducing the required value to $90 and when the response came back it could optionally modify the data to show a transaction of $100 had been approved. The user would be charged $90 but the merchant would see a normal transaction for $100. The $10 balance would be netted off against the merchant account as part of an aggregated daily settlement process, thus stopping data leakage. Such a service requires means to correctly interpret the payload sent to the PSP and so needs to have facility to be programmed to work with many different PSPs. As most PSP APIs are HTTP based with payloads that may be XML, JSON or name value pairs, this is not onerous to provide. Some PSPs also include the use of hash functions or HMAC signatures in their systems and where this is the case and the hash or digital signature is across the transaction amount the system needs to be configurable to enable recreation of the hash or signature after alteration of the amount.

Issuance of Offers or Rewards

Merchants may wish to make offers or promotions to sets of people meeting certain criteria. In addition to those users that the merchant has already conducted transactions with, he may wish to make offers to other users meeting the criteria with whom he has no transaction history. In order to do this the offers either need to be broadcast to all users or made available for users to browse. In both cases the system can filter out those users that do not meet the criteria as the user app is able to determine if criteria are met by inspecting data stored on the user's device. It is only necessary to check the users eligibility at the moment of redemption or, if the reward is in the form of a fungible token, at the time of claim.

As true broadcast to mobile devices can be difficult for reasons stated elsewhere in this document, a polling mechanism where user devices check for offers at intervals may be preferable.

Sale/Transfer of Tokens

Offers may be limited to a finite number of claimants e.g., the first 500, or limited only by time e.g., before a certain date Additional limits may be placed by way of fitness conditions i.e., the meeting of certain ad hoc criteria Offers may be broadcast to all allowing anyone meeting the criteria to store it for later claim and may be available on a first come first serve basis meaning that only say the first 500 people claiming a token will receive one (here we are talking about claiming a taken not claiming redemption).

In addition, people's eligibility may change over time i.e., at the time an offer is made they are not eligible, but they may become eligible before the redemption date.

This opens the possibility of a secondary market.

Figure 11:
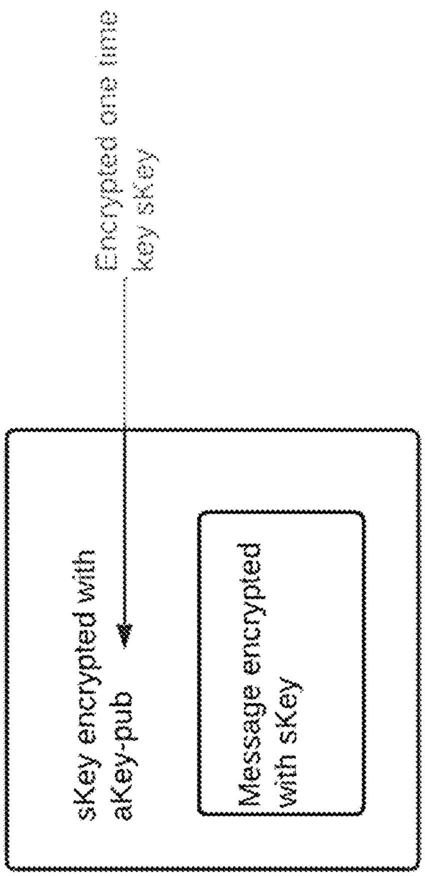
FIG. 11 illustrates an alternative encryption to an asymmetric encryption scheme.

FIG. 11 illustrates an alternative encryption to an asymmetric encryption scheme. According to FIG. 11, data can be encrypted with a symmetric algorithm like AES, and then the AES key is encrypted using asymmetric encryption with the public key of an intended recipient. The encrypted symmetric encryption key can then be sent along to the recipient with a message. The recipient then uses their private key to decrypt the encrypted symmetric key and then uses this to decrypt the message.

Figure 12:
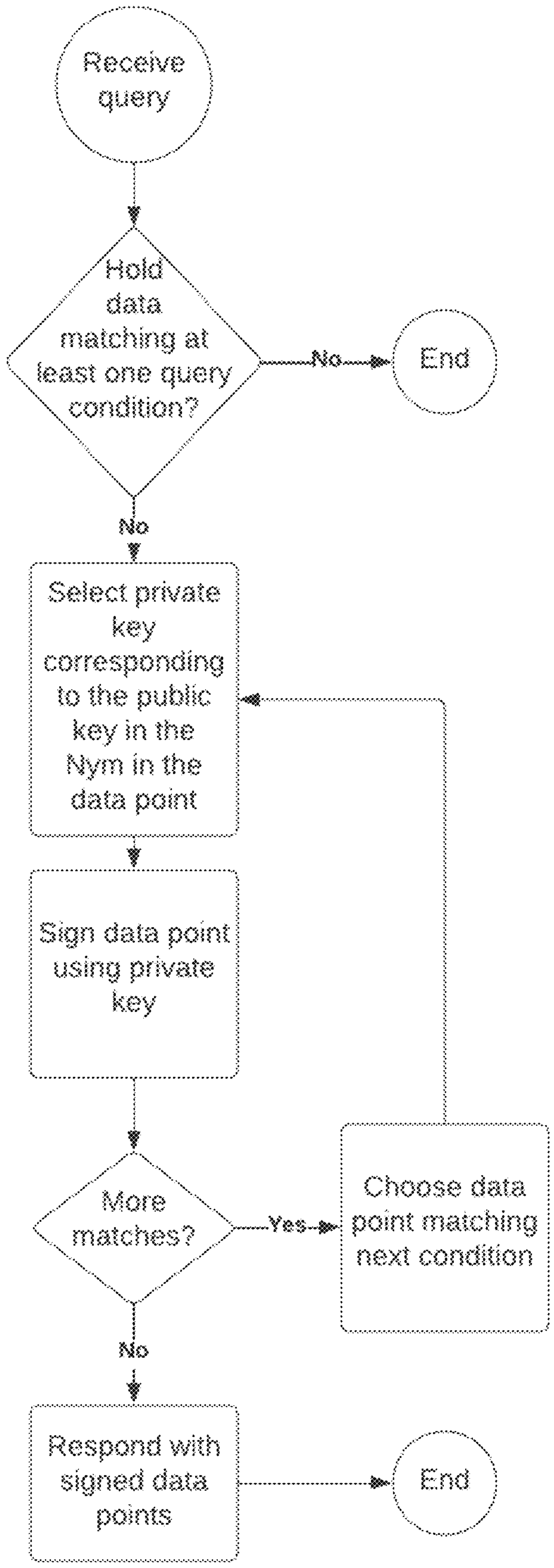
FIG. 12 illustrates a method according to an embodiment of the invention.

FIG. 12 illustrates an embodiment of the invention. In FIG. 12, a method 100 comprises:

- receiving 102 a query for data from a central server;
- determining 104 that data stored (or held) on the user device satisfies at least one condition of the query (i.e. determining whether the device holds data matching at least one query condition);
- determining 106 (or selecting) a previously generated public key, generated by the user device, using the data stored by the user device, wherein the data stored by the user device comprises a data envelope comprising data and the previously generated public key, and wherein the data envelope has been signed by an external entity (i.e. select a private key corresponding to the public key in the Nym in the data point);
- signing 108 the data envelope (or data point) using a private key forming a key pair with the previously generated public key; and
- responding 110 to the query with the signed data envelope (or data point).

The method may include determining 112 if there are further matches with other conditions of the query, and repeating steps 106 and 108. Furthermore, if the device does not have data matching at least one query condition the process ends 114.

Figure 13:
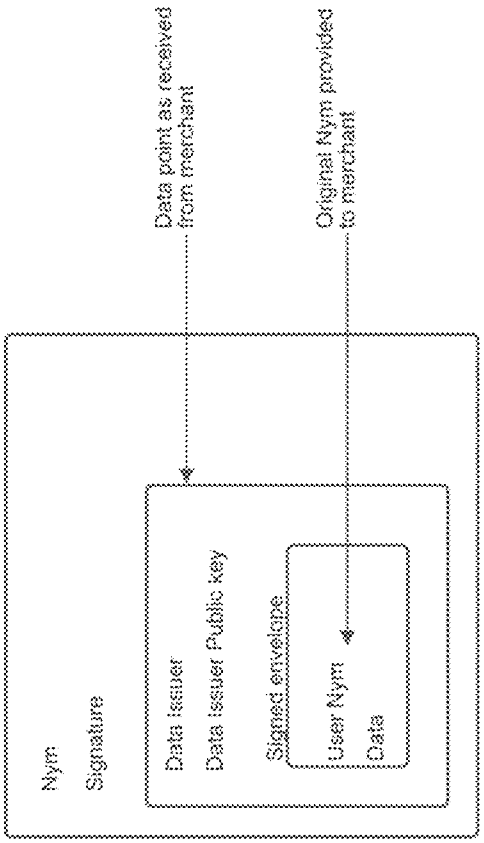
FIG. 13 illustrates a doubly signed data envelope according to an embodiment of the invention.

FIG. 13 illustrates a doubly signed data envelope according to an embodiment of the invention. As illustrated the original Nym (i.e., user Nym or user public key) is in a signed data envelope with data provide by the issuer, which has been signed using a private key of the data issuer (or merchant). The data issuer's identifier, and optionally public key, are contained in a second envelope which is signed with the user device's private key.

An embodiment of the invention may comprise a computer implemented method for redeeming tokens, comprising: receiving a token from a user device along with a condition and one or more data points; disseminating the one or more data points to one or more verifiers; and coordinating the responses.

Ownership of a token may be proven by checking a cryptographic signature associated with the token and/or an associated ledger entry. Evidence of both ownership and eligibility matching any attached conditions may be used when redeeming tokens.

Each data point relating to the token may be passed to a transaction verifier which coordinates with the claimant to verify the signatures on the data point.

Checks against the ledge may include checking whether: the user is the rightful owner, the token has not expired, and the token is valid to use in the particular transaction type involved. The last step may require the system co-ordinator to make a data request to the merchant to retrieve more details of the transaction.

A ledger may be used if tokens are to change hands, to be split or to have their values adjusted for whatever reason.

The term "comprising" encompasses "including" as well as "consisting" e.g. a composition "comprising" X may consist exclusively of X or may include something additional e.g. X+Y. Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, hard-drives, thumb drives, memory cards, etc. and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP (Digital Signal Processor), programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

The steps of the methods described herein may be carried out in any suitable order, or simultaneously where appropriate. Additionally, individual steps may be deleted from any of the methods without departing from the spirit and scope of the subject matter described herein. Aspects of any of the examples described above may be combined with aspects of any of the other examples described to form further examples without losing the effect sought. Any of the steps or processes described above may be implemented in hardware or software.

It will be understood that the above descriptions of preferred embodiments are given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

The invention claimed is:

1. A computer implemented method for distributed data management on a user device, comprising:
   - receiving a query for data from a central server;
   - determining that data stored on the user device satisfies at least one condition of the query;
   - selecting a public key, generated by the user device, using the data stored by the user device, wherein the data stored by the user device comprises a data envelope comprising data and the public key, and wherein the data envelope has been signed by an external entity;
   - signing the data envelope using a private key forming a key pair with the public key;
   - responding to the query with a short form random identifier;
   - receiving a validator public key generated by a validator and encrypting the data stored by the user device which satisfies the at least one condition with the validator public key; and
   - responding to the query by transmitting the encrypted data comprising the signed data envelope to the validator.

2. The method of claim 1, wherein the external entity has provided the data, or the external entity has vouched for the authentication of the data.

3. The method of claim 1, wherein the query for data comprises a query public key, and the signed data envelope is encrypted using the query public key before responding to the query.

4. The method of any one of claims 1 to 3, wherein the query is pushed to the user device by the central server.

5. The method of any one of claims 1 to 3, wherein the query is collected by the user device from the central server.

6. The method of any one of claims 1 to 3, wherein the data stored by the user device is at least one of data relating to a transaction and private data.

7. The method of any one of claims 1 to 3, wherein the user device responds with the signed data envelope and an external entity identification and optionally a public key of the external entity.

8. The method of any one of claims 1 to 3, wherein the user device is connected to a predetermined number of peer devices, and the user device forwards the query to the peer devices for processing.

9. The method of any one of claims 1 to 3 comprising:
receiving a message from the central server relating to a transaction;
generating a transaction public/private key pair and transmitting a request to a transaction merchant for transaction data with the transaction public key; and
receiving and storing a signed data envelope comprising the transaction data and the transaction public key, wherein the data envelope has been signed with a private key of the transaction merchant.

10. A computer implemented method for distributed data management on a central server, comprising:
generating a query for a user device;
sending the query to the user device;
receiving a short form random identifier from the user device in response to the query;
providing the short form random identifier and the query to at least one validator; and
receiving a result from the at least one validator based on whether data of a signed data envelope, received by the at least one validator from the user device, satisfies a condition of the query.

11. The method of claim 10, comprising pushing the short form random identifier and the query to the at least one validator, or making the short form random identifier and the query available for collection by the at least one validator.

12. The method of claim 10, wherein the central server receives a plurality of short form random identifiers and provides the plurality of short form random identifiers to a plurality of validators and combines the results from the plurality of validators.

13. A computer implemented method for distributed data management using a validator, comprising:
receiving a short form random identifier of a user device and a query from a central server;
providing a validation public key and the short form random identifier of the user device to the user device;
receiving, from the user device, a data envelope associated with the short form random identifier of the user device, wherein the data envelope is encrypted with the validation public key;
determining if data in the data envelope satisfies at least one condition of the query; and
transmitting to the central server a result based on whether the data in the data envelope satisfies the at least one condition of the query.

14. The method of claim 13, wherein the data envelope is signed with a private key forming a key pair with a public key of the user device.

15. The method of claim 13, wherein the validation public key and the short form random identifier of the user device are sent to the user device or made available for the user device to collect.

16. The method of any one of claim 13, wherein receiving a short form random identifier of a user device and a query from a central server comprises receiving a plurality of short form random identifiers and selecting one for processing.

17. The method of any one of claim 13, wherein the validator is a user device.

18. A computer program comprising instructions which, when the program is executed by a computer, cause the computer to carry out the method of claim 1.

19. A non-transitory computer-readable medium comprising instructions which, when executed by a computer, cause the computer to carry out the method of claim 1.

20. A data processing device comprising a processor adapted to perform the method of claim 1.

* * * * *